(12) United States Patent
Dessel (10) Patent No.: US 10,307,962 B2
(45) Date of Patent: Jun. 4, 2019

(54) METHOD AND SYSTEM FOR FABRICATING THERMAL INSULATION FOR RETROFIT APPLICATIONS

(71) Applicant: Worcester Polytechnic Institute, Worcester, MA (US)

(72) Inventor: Steven Van Dessel, Shrewsbury, MA (US)

(73) Assignee: Worcester Polytechnic Institute, Worcester, MA (US)

(*) Notice: Subject to any disclaimer, the term of this patent is extended or adjusted under 35 U.S.C. 154(b) by 692 days.

(21) Appl. No.: 14/611,335

(22) Filed: Feb. 2, 2015

(65) Prior Publication Data

US 2016/0001508 A1 Jan. 7, 2016

Related U.S. Application Data

(60) Provisional application No. 61/934,824, filed on Feb. 2, 2014.

(51) Int. Cl.
*H04N 1/00* (2006.01)
*B29C 39/12* (2006.01)
(Continued)

(52) U.S. Cl.
CPC ........ *B29C 64/386* (2017.08); *G06F 17/5004* (2013.01); *H04N 1/00827* (2013.01);
(Continued)

(58) Field of Classification Search
CPC .................. G06F 17/50; G06F 17/5004; Y10T 29/49623; Y10T 29/49629; Y10T 29/4998; Y10T 29/49982; E04B 1/62; E04B 1/74; E04B 1/76; E04B 1/7608; E04B 1/762; E04B 1/7641; E04B 1/80; E04B 2001/8245; E04F 13/075; E04F 13/0875;
(Continued)

(56) References Cited

U.S. PATENT DOCUMENTS

2007/0095010 A1* 5/2007 Amend ..................... E04B 1/80
52/745.19
2008/0034698 A1* 2/2008 Gupta ....................... E04B 1/74
52/507
(Continued)

FOREIGN PATENT DOCUMENTS

| DE | 19544713 A1 * | 6/1997 | ............. E04B 1/762 |
| EP | 1637665 A1 * | 3/2006 | ............. E04B 1/762 |
| EP | 2213805 A1 * | 8/2010 | ............... E04B 1/76 |

OTHER PUBLICATIONS

Translation of DE 19544713 A1, generated Aug. 24, 2017.*
Translation of EP 1637665 A1, generated Aug. 24, 2017.*
Translation of EP 2213805 A1, generated Aug. 24, 2017.*

*Primary Examiner* — Matthew P Travers
(74) *Attorney, Agent, or Firm* — Mintz Levin Cohn Ferris Glovsky and Popeo, P.C.; David G. Conlin; Jonathon P. Western (57) ABSTRACT

A three-dimensional (3D) laser-based scan of a façade of a structure is conducted. Based on data of the 3D laser-based scan, a 3D computer model of the façade is generated. Then, a design of insulation to be installed on the façade is determined based on the generated 3D computer model. According to the determined design, insulation is fabricated via an automated fabrication process.

16 Claims, 8 Drawing Sheets

(51) Int. Cl.
    *B29D 99/00* (2010.01)
    *B29L 31/00* (2006.01)
    *B29L 31/10* (2006.01)
    *E04F 13/08* (2006.01)
    *G06F 17/50* (2006.01)
    *B29C 64/386* (2017.01)
    *E04F 13/16* (2006.01)

(52) U.S. Cl.
    CPC .......... *B29C 39/123* (2013.01); *B29D 99/001* (2013.01); *B29L 2031/10* (2013.01); *B29L 2031/776* (2013.01); *E04F 13/0875* (2013.01); *E04F 13/16* (2013.01); *G06F 2217/80* (2013.01)

(58) Field of Classification Search
    CPC ... B29C 39/02; B29C 67/0011; B29C 64/386; B29C 33/3842; B29C 39/12–39/123; B29C 41/22; B29C 44/12; B29D 7/00; B29D 99/001; B29D 99/0017; B29L 2007/002; B29L 2009/005; B29L 2031/10; B29L 2031/776
    USPC .......... 52/309.1, 309.4, 309.7, 309.8, 309.9, 52/309.13, 309.14, 309.16, 506.01
    See application file for complete search history.

(56) References Cited

U.S. PATENT DOCUMENTS

| | | | |
|---|---|---|---|
| 2008/0313991 A1* | 12/2008 | Chouinard | E04C 2/044 52/506.01 |
| 2009/0308001 A1* | 12/2009 | Wu | E04B 1/762 52/173.3 |
| 2010/0095625 A1* | 4/2010 | Boutaghou | B32B 3/02 52/506.01 |
| 2010/0332355 A1* | 12/2010 | Lopez | G06F 17/5004 705/27.1 |
| 2011/0054652 A1* | 3/2011 | Heil | G05B 19/4097 700/98 |
| 2011/0258944 A1* | 10/2011 | Radoane | E04B 2/58 52/62 |
| 2012/0174511 A1* | 7/2012 | Harding | B66F 9/142 52/302.1 |
| 2013/0173223 A1* | 7/2013 | Teller | G06F 17/5004 703/1 |
| 2014/0052416 A1* | 2/2014 | Yu | G06F 17/5004 703/1 |
| 2014/0278280 A1* | 9/2014 | Pardo-Fernandez | G06F 17/5004 703/1 |
| 2014/0365180 A1* | 12/2014 | Lam | G06F 17/5004 703/1 |

* cited by examiner

METHOD AND SYSTEM FOR FABRICATING THERMAL INSULATION FOR RETROFIT APPLICATIONS

CROSS-REFERENCE TO RELATED APPLICATION

This application claims priority to and the benefit of U.S. Provisional Patent Application No. 61/934,824 filed in the United States Patent and Trademark Office on Feb. 2, 2014, the entire contents of which being incorporated herein by reference.

TECHNICAL FIELD

The present invention relates generally to insulation fabrication techniques, and more particularly, to a method and system for fabricating thermal insulation cladding systems for retrofit applications.

BACKGROUND

In building retrofit applications, it is often desirable to incorporate thermal insulation for the purpose of achieving cost savings and improved energy efficiency. While certain thermal insulation materials are affordable, the overall costs of installing thermal insulation in existing buildings, otherwise known as façade retrofit projects, tend to be expensive. This is due, in part, to existing buildings being structurally diverse with external façades that may include variations. Unfortunately, in order to accommodate these myriad façade variations, current retrofit approaches result in cumbersome and inefficient solutions that fail to produce optimal long-term energy savings.

In a typical retrofit process, multiple stages exist, including: documentation, design, fabrication, installation, and maintenance. With current retrofit approaches, however, inefficiencies arise at each stage, thus contributing to a likely failure to achieve optimal long-term energy savings. For instance, during the documentation stage, e.g., capturing information regarding the façade of a building, challenges exist due to myriad variations in existing buildings, such as walls that are not plumb, windows of various sizes, and unique elements including rain pipes, gutters, and window trim. Most retrofit projects are not carefully documented beforehand, as quick on-site visual surveys and recording of the most basic measurements are the prevailing documentation methods. While better design solutions can be derived when more detailed information is available, detailed façade documentation is often omitted as it is time consuming and therefore expensive.

After the documentation is complete, the insulation may be designed so as to be customized according to the particular façade. However, most current façade retrofit projects are rarely designed beforehand. This is especially true for single family residences and other small-scale projects. Instead, projects are realized through on-site decision-making based upon contractor experience and standardized detailing solutions of systems available on the market. This approach often results in problems that are hard to correct afterwards, have poor thermal performance, and increase long term cost. Further, as design consultation is expensive, it is mostly omitted from the delivery process.

Like the design process, the typical fabrication and installation processes also involve a great deal of on-site labor. For instance, materials are typically transported to the construction site where they are cut to size, attached to the building, and finished in-situ using labor intensive methods, e.g., exterior insulation and finishing system (EIFS). These construction processes can be time consuming, subject to inclement weather, affected by differences in worker skill levels, and often resulting in material waste.

The final step in the typical retrofit process is the maintenance stage, as retrofitted structures require constant maintenance and may also undergo alterations over their lifespan. Also, the structure's façade may be modified over time, and as a result, the insulation is required to be modified accordingly. Moreover, when damage occurs or maintenance is needed, on-site repairs and alterations need to match existing systems.

Problems encountered in a typical retrofit process can be difficult to correct afterwards, thereby increasing long term costs. Current deficiencies in façade retrofit processes can be especially problematic for small-scale retrofit projects, such as residences, where fabrication and installation are primarily motivated by a desire to reduce maintenance and improve appearance, and not necessarily to increase thermal performance.

SUMMARY

According to the present invention, a three-dimensional (3D) laser-based scan of a façade of a structure is conducted. Based on data of the 3D laser-based scan, a 3D computer model of the façade is generated. Then, a design of insulation to be installed on the façade is determined based on the generated 3D computer model. According to the determined design, insulation is fabricated via an automated fabrication process. A system and a non-transitory computer-readable medium directed to the same are also provided.

According to the present invention, a method includes: conducting a three-dimensional (3D) laser-based scan of a façade of a structure; generating a 3D computer model of the façade based on data of the 3D laser-based scan; determining a design of insulation to be installed on the façade based on the generated 3D computer model; and fabricating insulation via an automated fabrication process according to the determined design. The method can further include: installing the fabricated insulation on the façade. Also, the method can include: programming a computer numerical control (CNC) manufacturing tool according to the determined design; and fabricating the insulation using the CNC manufacturing tool. Further, the method can include: translating the determined design into a format suitable for the programming of the CNC manufacturing tool. Further, the method can include: programming a computer aided design (CAD) tool according to the data of the 3D laser-based scan; and generating the 3D computer model using the CAD tool. Moreover, according to the method, the generated 3D computer model can be a Building Information Model (BIM). The method can further include: modifying an aspect of the generated 3D computer model, such that a performance of the insulation would be improved. Further, the method can include: estimating a cost of the determined design; and modifying the determined design based on the estimated cost. Additionally, the method can include: accessing a database of stored insulation design data; and determining the design further based on the stored insulation design data. Further, the method can include: determining a plurality of insulation design alternatives based on the generated 3D computer model; and selecting one design of the plurality of insulation design alternatives as the determined design based on one or more criteria. Further, according to the method, the automated fabrication process can include: forming casting cavities in a substrate, creating casting barriers in the substrate operable to contain a resin-based substance to be casted, casting the resin-based substance in the formed casting cavities, and processing at least one of the substrate and the casted resin-based substance to form an insulation panel. The automated fabrication process can further include: depositing a second resin-based substance on the insulation panel to create an additional feature, depositing a finishing coat on a surface of the insulation panel, and forming a foam gasket in the insulation panel to seal an edge of the insulation panel. Further, according to the method, the fabricating of the insulation can include: adding a secondary functionality component to the insulation.

According to the present invention, a system includes: a 3D laser-based scanning device that conducts a 3D laser-based scan of a façade of a structure; a model generating controller that generates a 3D computer model of the façade based on data of the 3D laser-based scan; a design controller that determines a design of insulation to be installed on the façade based on the generated 3D computer model; and an automated fabrication tool that fabricates insulation via an automated fabrication process according to the determined design. Also, the automated fabrication tool can be a computer numerical control (CNC) manufacturing tool that is programmed according to the determined design. Further, the determined design can be translated into a format suitable for the CNC manufacturing tool to be programmed. Additionally, the model generating controller can be a component of a computer aided design (CAD) tool that is programmed according to the data of the 3D laser-based scan. Moreover, the generated 3D computer model can be a Building Information Model (BIM). Further, the automated fabrication process can include: forming casting cavities in a substrate, creating casting barriers in the substrate operable to contain a resin-based substance to be casted, casting the resin-based substance in the formed casting cavities, and processing at least one of the substrate and the casted resin-based substance to form an insulation panel.

According to the present invention, a non-transitory computer-readable medium contains program instructions executable by a controller, where a 3D laser-based scanning device conducts a 3D laser-based scan of a façade of a structure, a model generating controller generates a 3D computer model of the façade based on data of the 3D laser-based scan, and a design controller determines a design of insulation to be installed on the façade based on the generated 3D computer model, and the computer-readable medium includes: program instructions that cause an automated fabrication tool to fabricate insulation via an automated fabrication process according to the determined design.

BRIEF DESCRIPTION OF THE DRAWINGS

The foregoing and other objects, features, aspects and advantages of the embodiments disclosed herein will become more apparent from the following detailed description when taken in conjunction with the following accompanying drawings.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that a number of the below methods are executed by at least one controller. The term "controller" refers to a hardware device that includes a memory and a processor. The memory is configured to store program instructions and the processor is specifically configured to execute said program instructions to perform one or more processes which are described further below.

Further, the controller of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Retrofit insulation is the process of insulating (or re-insulating) an existing structure, e.g., building, house, etc. The process is useful for enhancing the insulation of the existing structure, typically where the structure has deficient or poorly installed insulation. Undergoing a retrofit façade project can significantly reduce heating and cooling costs, and increase energy consumption efficiency.

In view of the multitude of shortcomings in current retrofit insulation techniques, an improved retrofitting approach with increased efficiency is needed. As such, the techniques herein provide for the delivery of highly customized cladding systems with integrated thermal insulation, focusing on retrofit applications. The disclosed techniques involve a design process based upon a three-dimensional (3D) laser-based scanning documentation stage, followed by an automated fabrication process using multiple automated, e.g., computer numeric controlled (CNC), fabrication techniques.

Figure 1:
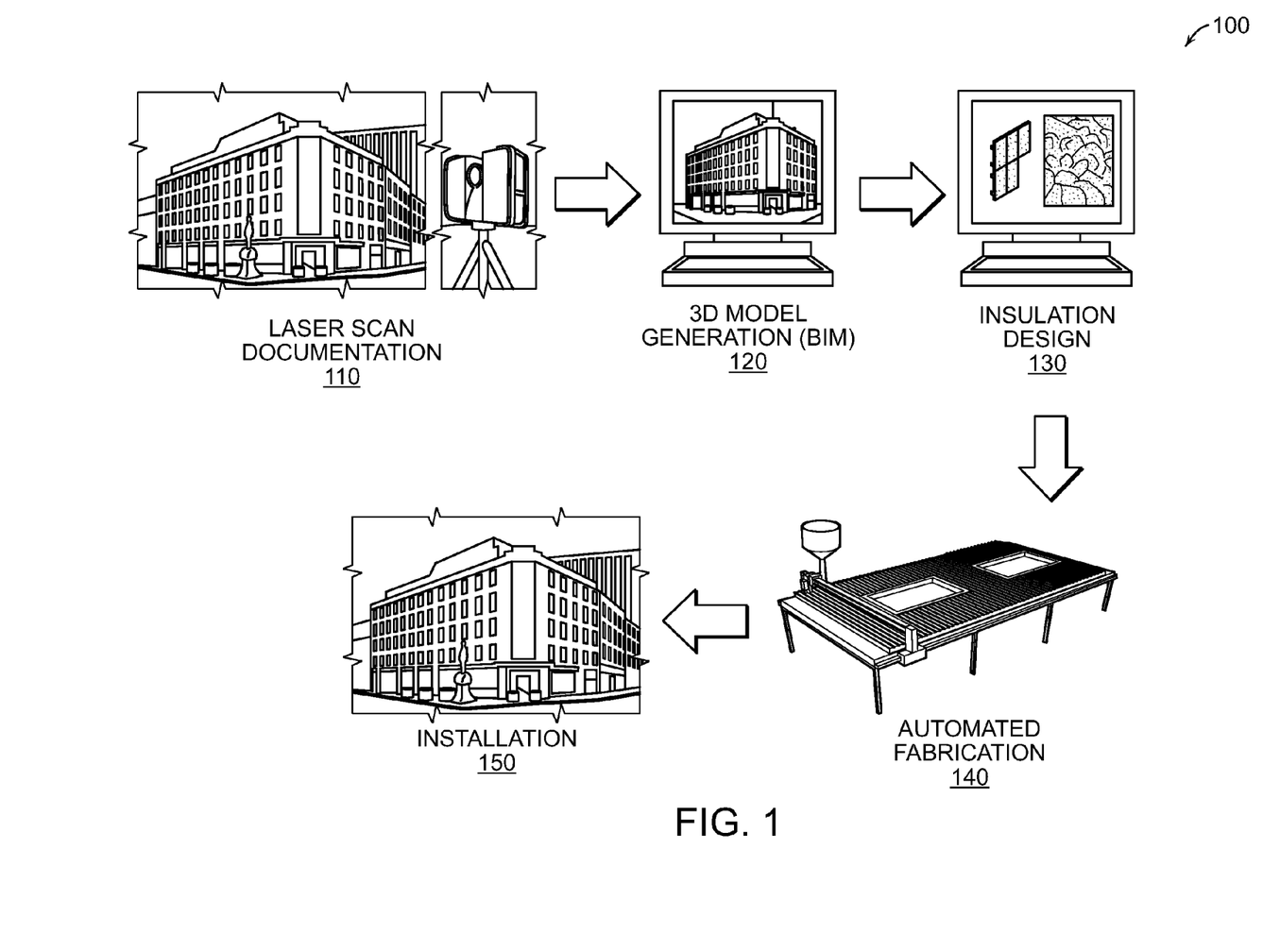
FIG. 1 illustrates an example diagrammatic view of an automated façade retrofit approach according to an embodiment of the present invention.

FIG. 1 illustrates an example diagrammatic view of an automated façade retrofit approach according to an embodiment of the present invention. As shown in FIG. 1, the retrofit process 100 includes multiple stages: a documentation stage 110, a 3D model generation stage 120, an insulation design stage 130, an automated fabrication stage 140, and an installation stage 150. The above processes may be integrated into an automated production environment, whereby each production step is designed to reduce cost and increase quality of a façade retrofit project.

In the documentation stage 110, a 3D laser-based scan of a façade of a structure is conducted. The structure may be any type of building, such as a commercial or industrial building, residential dwelling, or the like. The 3D laser-based scan is used to document the structure's façade in great detail, thereby increasing the quality of the structure documentation. In particular, as 3D laser-based scanning technologies are becoming more affordable, it is possible to document existing buildings for retrofit purposes, as is currently already the case when documenting historical buildings. The 3D laser-based scanning may be performed by a 3D laser-based scanning device, which may include any device suitable for analyzing a real-world object or environment and collecting data on its shape and/or appearance using laser-based techniques. As is known in the art, the collected data may then be used to construct a digital, three dimensional model of the scanned façade, as explained below.

In the 3D model generation stage 120, a 3D computer model of the façade is generated based on data of the 3D laser-based scan. The data of the 3D laser-based scan, e.g., 3D laser-scan point-cloud data, may be used by a model generating controller to generate the 3D computer model of the façade. The model generating controller may refer to a hardware device that includes a memory and a processor, the memory being configured to store program instructions and the processor being specifically configured to execute the program instructions to perform one or more processes. The model generating controller may be a component of a computer aided design (CAD) tool that is programmed according to the data of the 3D laser-based scan.

The 3D laser-based scan data may be imported into a computer aided design (CAD) tool, which can be used during the design, fabrication, and installation stages, as well as for estimating cost and developing design alternatives. The CAD tool may be programmed according to the 3D laser-based scan data, and the 3D computer model may be generated using the CAD tool. The generated 3D computer model may be of any format suitable for digital representation of physical and functional characteristics of a structure's façade, including, for example, a Building Information Model (BIM). Notably, the BIM model may support other processes, such as cost management, construction management, project management, and facility operation, which may enhance the efficiency of the retrofit process 100.

Further, an aspect of the generated 3D computer model may be modified, such that a performance of the insulation can be improved. In this regard, the façade patterning may be optimized using various structural modeling tools, e.g., CAD tools. These tools allow for various design criteria to be considered in order to improve the performance of the insulation to be installed. For example, the generated 3D computer model of the façade may be modified to minimize joints or align cladding seams with existing façade elements, e.g., windows, doors, etc.

In the insulation design stage 130, a design of insulation to be installed on the façade is determined based on the generated 3D computer model. The insulation design may be determined by a design controller. The design controller may refer to a hardware device that includes a memory and a processor, the memory being configured to store program instructions and the processor being specifically configured to execute the program instructions to perform one or more processes. Like the model generating controller, the design controller may be a component of a computer aided design (CAD) tool.

The disclosed design process may be semi-automated or fully automated based upon the particular retrofit process, whereby structural modeling tools, e.g., CAD tools, may be used to develop robust and highly customized façade designs. The design process may be semi-automated, for example, by using software tools that optimize façade patterning and implement standardized connection detailing. These tools may also be used for developing and implementing standardized connection details. Furthermore, BIMs can be developed that may be used during the procurement, fabrication, and installation stages.

Additional steps may be taken during the insulation design stage 130. For instance, a cost of the determined insulation design may be estimated, e.g., using CAD tools and/or BIMs. Then, depending on the estimated cost, the determined design may be modified in order to reduce costs. Furthermore, insulation design data, containing connection details, for example, may be stored in a database. The database of insulation design data may be accessed, and the insulation design may be determined based on the stored insulation design data. Even further, a plurality of insulation design alternatives may be determined based on the generated 3D computer model, e.g., using CAD tools and/or BIMs. Then, one design of the plurality of insulation design alternatives may be selected based on one or more criteria, including but not limited to: cost estimation, energy efficiency, appearance, machinery limitations, and so forth.

Figure 7:
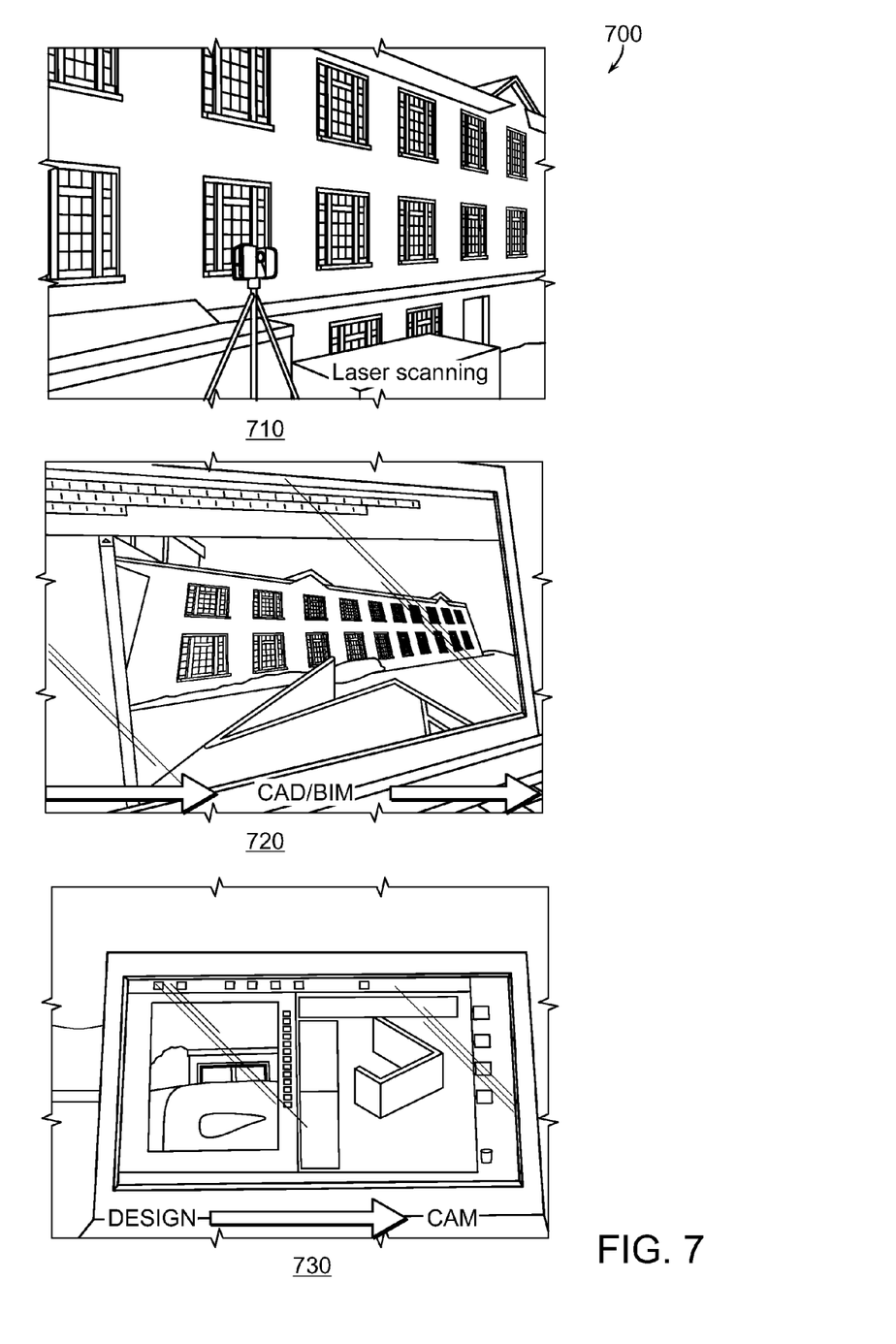
FIG. 7 illustrates an example simplified workflow for an integrated delivery process.

An example simplified workflow for an integrated delivery process is illustrated in FIG. 7. As shown in FIG. 7, an integrated delivery process 700 includes example delivery steps 710-730, including a documentation step 710 (e.g., "laser scanning"), followed by a generation step 720 (e.g., "CAD/BIM"), and followed by a design step 730 thereafter (e.g., "design/CAM").

In the automated fabrication stage 140, insulation is fabricated via an automated fabrication process according to the design determined in the insulation design stage 130. The insulation may be fabricated by an automated fabrication tool, which may be a computer numerical control (CNC) manufacturing tool that is programmed according to the determined design. To enable the CNC manufacturing tool to be programmed, the determined design may be translated into a data format suitable for the CNC manufacturing tool.

Figure 2:
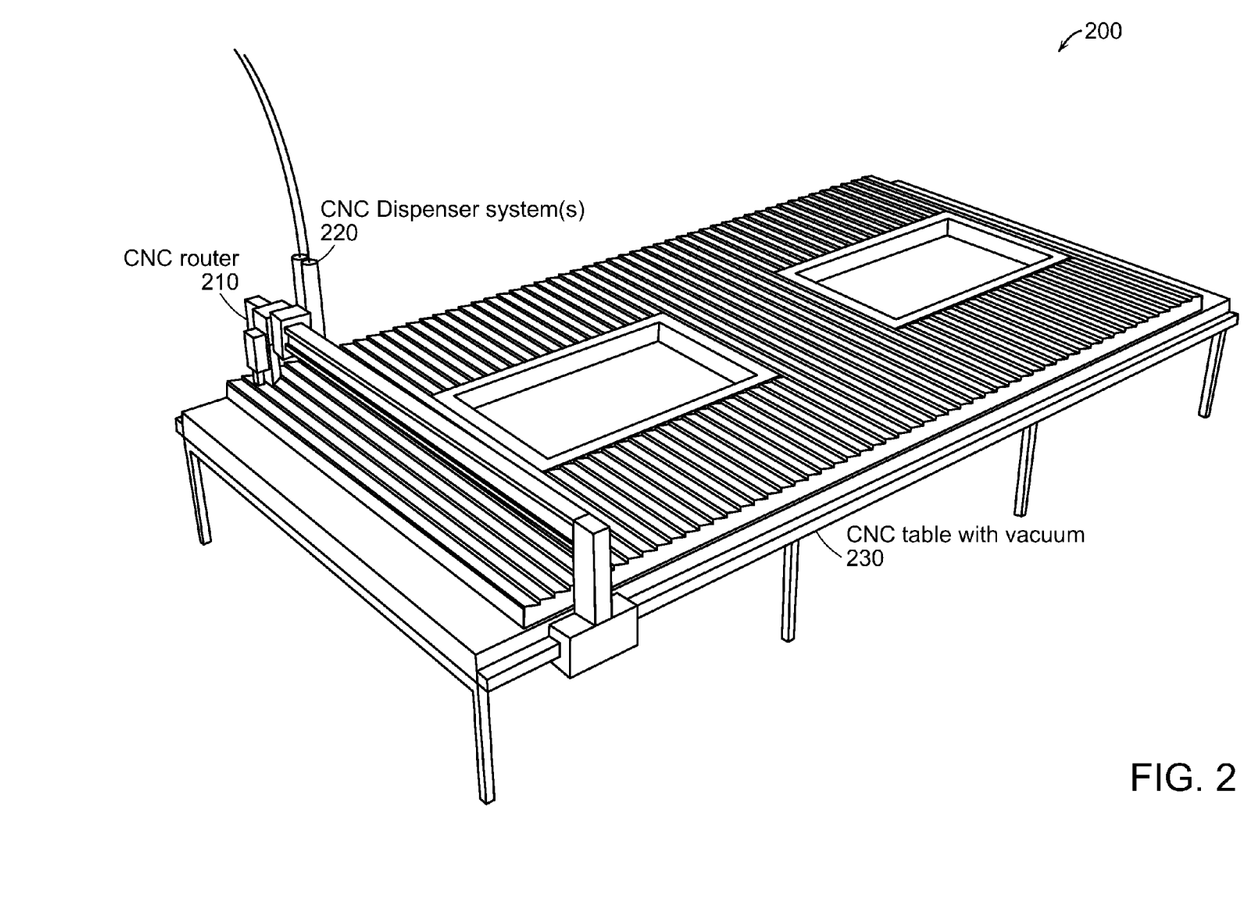
FIG. 2 illustrates an example schematic representation of a CNC manufacturing system according to an embodiment of the present invention.

The automated fabrication tool may include multiple CNC components. For instance, FIG. 2 illustrates an example schematic representation of a CNC manufacturing system according to an embodiment of the present invention. As shown in FIG. 2, the CNC manufacturing system 200 includes a CNC router 210, a CNC dispenser 220, and a CNC table with vacuum 230. It should be noted that although FIG. 2 depicts CNC components specifically, the automated fabrication stage 140 is not limited to the use of CNC components. Rather, any suitable automated fabrication tool may be utilized.

The disclosed fabrication process involves automated manufacturing tools to prefabricate highly customized, thermally-insulated cladding systems. Importantly, the automation allows for a fabrication process that shortens delivery time, reduces costs, and increases the quality of a typical facade retrofit project. Each step of the fabrication process may be fully automated using the techniques detailed below.

Figure 3:
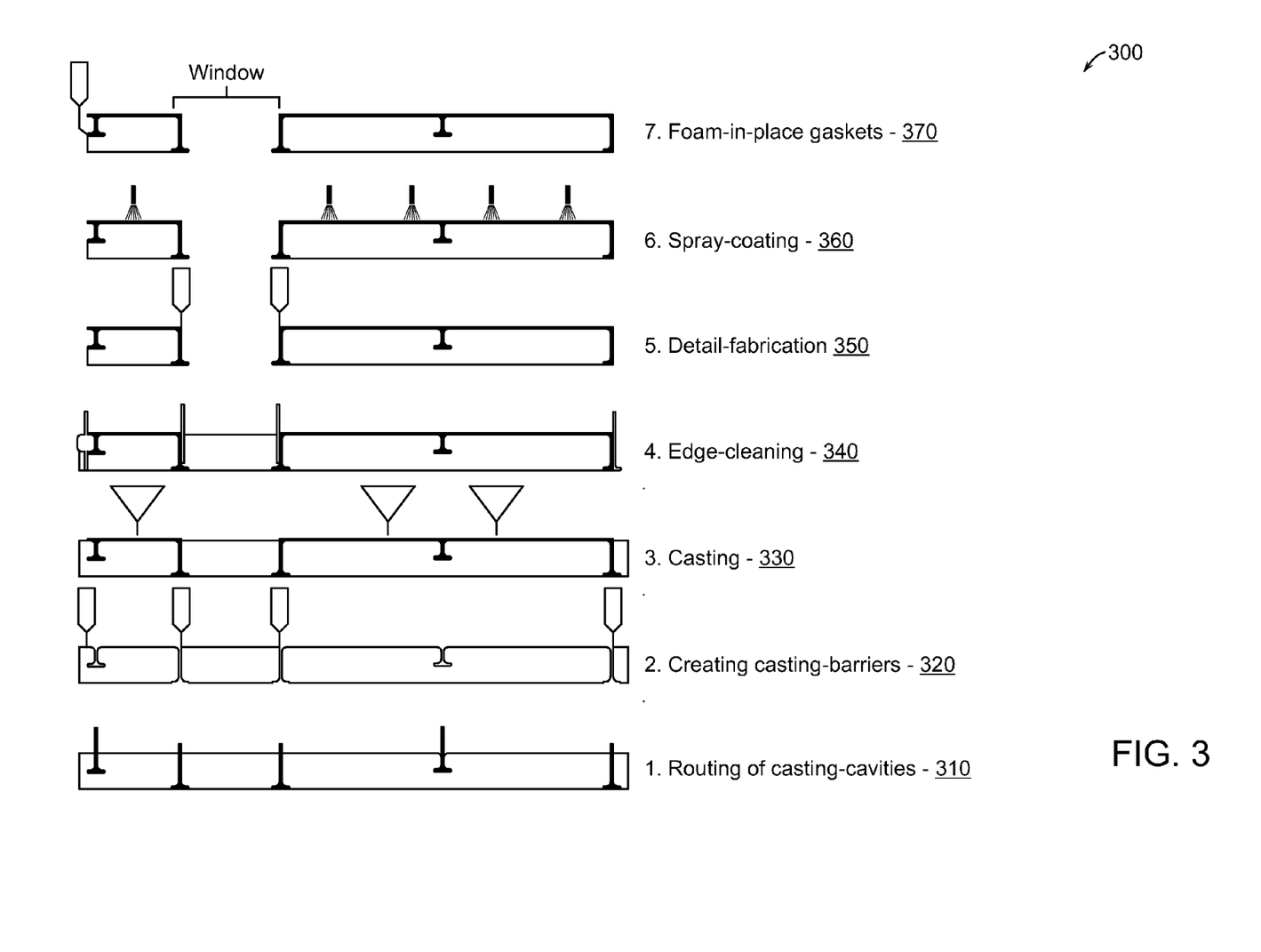
FIG. 3 illustrates an example simplified workflow for an automated fabrication process according to an embodiment of the present invention.

FIG. 3 illustrates an example simplified workflow for an automated fabrication process according to an embodiment of the present invention. As shown in FIG. 3, an automated fabrication process 300 includes multiple automated fabrication steps 310-370. The automated fabrication process 300 may utilize the CNC manufacturing system 200, for example. It should be understood that the listing of the fabrication steps 310-370 should not be treated as limiting the automated fabrication stage 140. Rather, particular fabrication steps may be combined into a single step, the ordering of the fabrication steps may be rearranged as dictated by the façade, and the inclusion of certain fabrication steps may be optional. In particular, fabrication steps 350-370, which can add additional design features, e.g., surface texturing, color, pre-sealing features, and the like, may be omitted from the automated fabrication process 300 altogether.

First, at step 310, an insulating substrate may be placed onto a CNC table (e.g., the CNC table 230) acting as the production platform, and the substrate may be held in place by a vacuum. Notably, the vacuum may act to hold the fabrication materials in place on the CNC platform throughout the entirety of the fabrication process 300. This can help to reduce material handling on the work floor and avoid repositioning tasks between the various production steps. In addition, the vacuum may serve as a mechanism to draw the casting resin (described further below) into the opened cell structure of the insulation panel cuts, thus assuring good adhesion and mechanical anchoring between the casting resin and the insulation.

Figure 4:
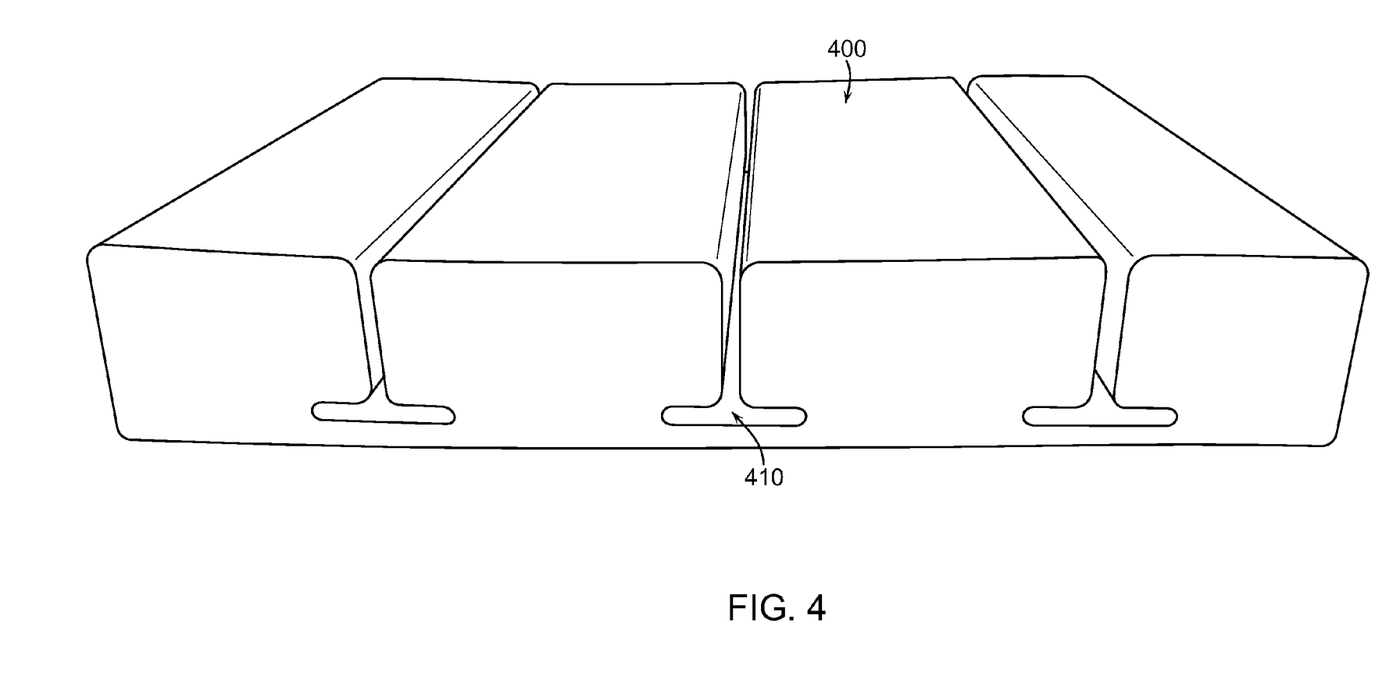
FIG. 4 illustrates an example of CNC-fabricated casting cavities according to an embodiment of the present invention.
Figure 5:
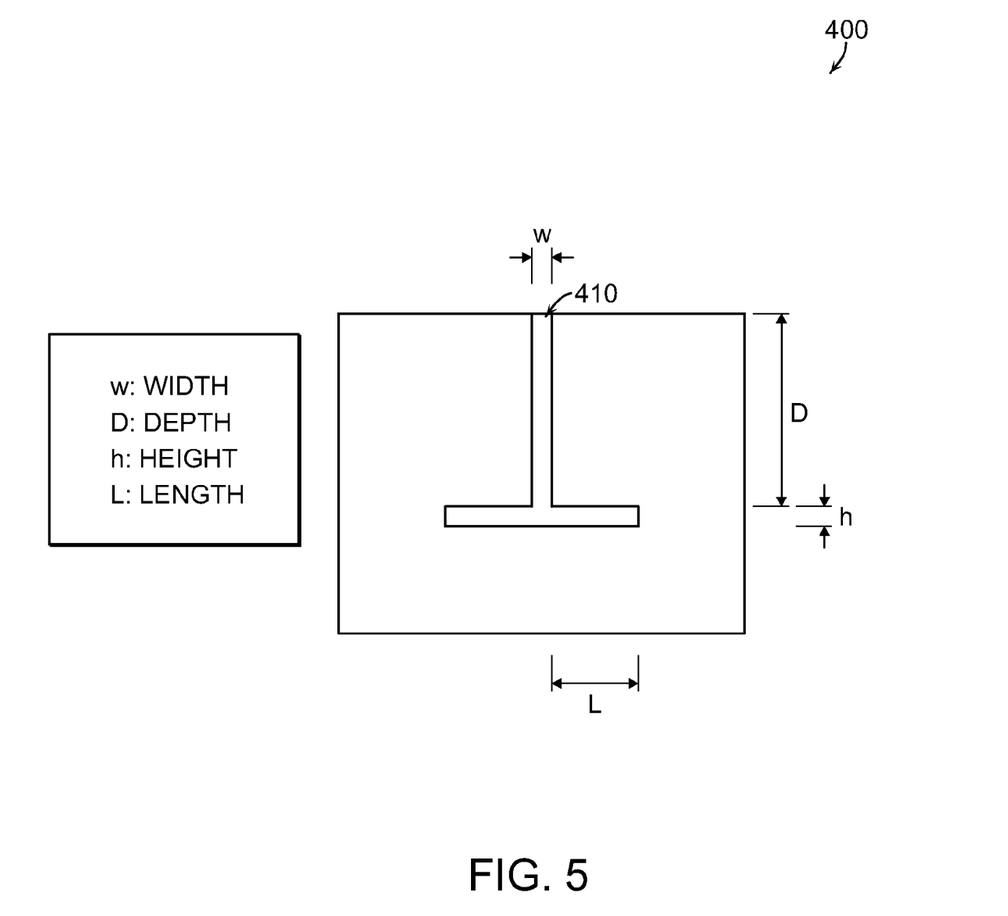
FIG. 5 illustrates an example cross-sectional schematic view of the CNC-fabricated casting cavities according to an embodiment of the present invention.
Figures 6A, 6B, 6C, 6D, 6E:
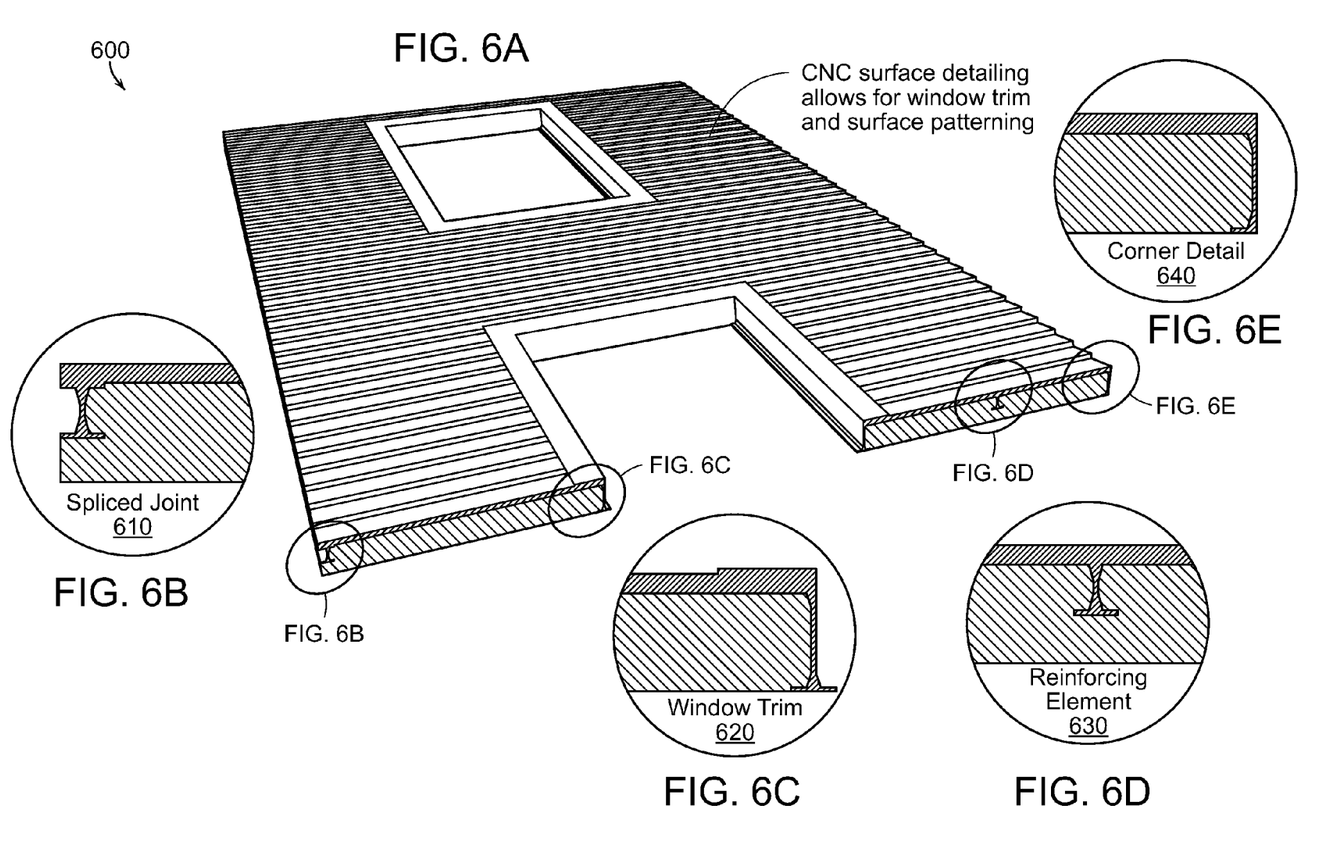
FIGS. 6A-6E illustrate example schematic representations of a finalized insulation panel according to an embodiment of the present invention.

Regarding the substrate, wide variety of insulating substrates may be used, such as a foam insulation board. Then, a CNC router (e.g., CNC router 210) may be used to create casting cavities that will later form the customized edges, internal stiffeners, window trim, and attachment points of the fabricated insulation panels. Various surface patterns may be created on the substrate, as well. For instance, FIG. 4 illustrates an example of CNC-fabricated casting cavities according to an embodiment of the present invention. As shown in FIG. 4, the insulating substrate 400 includes casting cavities 410 for panel stiffening ribs. Additionally, FIG. 5 illustrates an example cross-sectional schematic view of the CNC-fabricated casting cavities according to an embodiment of the present invention. As shown in FIG. 5, the insulating substrate 400 includes the casting cavities 410 along with multiple cavity dimensions, e.g., width, depth, height, length, that can be customized based on the façade design.

Next, at step 320, a casting barrier may be created to contain the casting resin to be applied in step 330. Typically, before resins are cast, a temporary barrier can be created to contain the casting resin at the various panel edges. The barrier material may be dispensed at the edges of the casting cavities, for example. Various alternative techniques for creating the casting barrier can be used, as well, including, but not limited to: (i) dispensing a fast curing high-viscosity resin at the cast boundaries, (ii) creating a barrier by additional surface routing, and (iii) installing a separate casting edge around the entire foam substrate before the routing in step 310 begins.

Next, at step 330, a CNC dispenser system (e.g., the CNC dispenser 220) may cast a resin-based substance into the casting cavities (and/or on top of the insulation panel), where the casted resin-based substance is contained by the casting barriers deposited in step 320. During the casting, the cavities created in step 310 may be filled first, and the top surface may be flooded immediately afterward so as to form one homogeneous system. When a low-viscosity and self-leveling casting resin is used, a smooth top surface may be produced. After, the casting resin may form the primary external layer, internal stiffeners, and edges resulting in a structurally sound construction.

Many varieties of resin-based substance may be used, although a fast-curing, low-viscosity resin is preferable. Many suitable polymer systems exist, including, for example, two component thermoset resin systems, UV cured resin systems, various thermoplastic resin systems, polymer modified cement based inorganic matrixes, and so forth. In addition, various reinforcing fillers may also be used as the resin-based substance.

Next, at step 340, a CNC router (e.g., the CNC router 210) may be used to process one or both of the substrate and the casted resin-based substance to form an insulation panel. More specifically, the CNC router may clean/release the insulation panel edges and clear-out excess foam. Various surface patterns can also be created in the resin surface, if desired. Further, some perimeter foam may remain loosely attached to form a cushioning layer to protect panel edges during transportation.

Next, at step 350, a second resin-based substance may be deposited on the insulation panel to create an additional feature, e.g., "detail fabrication." That is, a CNC dispenser system (e.g., the CNC dispenser 220) may deposit a second resin-based substance, such as a fast-curing high-viscosity resin, using additive manufacturing layering techniques, to create various architectural details, including window trim and patterning, for example.

Next, at step 360, a finishing coat, such as a fast-curing coat, may be deposited on a surface of the insulation panel. A CNC spray-system (e.g., the CNC dispenser 220) may deposit the finishing coat onto the panel, so as to cover substantially all surfaces and edges of the insulation panel.

Next, at step 370, a foam gasket may be formed in the insulation panel to seal an edge of the insulation panel. That is, a CNC dispenser system (e.g., the CNC dispenser 220) may apply a foam in-place gasket system to the panel edges, such that the foam gasket may be formed in-situ. The foam gasket may provide an air-sealing mechanism and may be applied when on-site wet-sealing is desired.

The automated fabrication process 300 may produce a finalized insulation panel for installation on the façade. All panel dimensions and details may be easily customized using the automated fabrication techniques disclosed herein. In this regard, the finalized panel may include a number of structural and/or appearance-enhancing features based on the design determined in the insulation design stage 130. For instance, FIGS. 6A-6E illustrate example schematic representations of a finalized insulation panel according to an embodiment of the present invention. As shown in FIGS. 6A-6E, the finalized insulation panel 600 includes multiple structural and/or appearance-enhancing features, such as a spliced joint 610, a window trim 620, a reinforcing element 630, and a corner detail 640. It should be noted that the features shown in FIGS. 6A-6E do not limit the design or fabrication possibilities of the insulation and are merely depicted for demonstration purposes.

In addition to the above fabrication techniques, a secondary functionality component may be added to the insulation. That is, the disclosed fabrication techniques may be used to add new construction features to the retrofit façade system. For example, the panelized system can include structural members that are load bearing, and hence, the technology can be further developed into a complete building system. In addition to façade retrofitting, the technique may also be adapted to roof retrofitting applications.

Moreover, the disclosed fabrication techniques may be used to add other functional performances to the wall system. For instance, when a conducting polymer resin is used instead of non-conducting resin, an electrical conduit can be directly integrated into the wall assembly. Similarly, outlet boxes or plumbing features may also be fabricated in a similar casting or dispensing fashion. For the purposes of the present disclosure, both new construction features and added functional performance which can complement the retrofitting applications may be referred to as a "secondary functionality component." Notably, the added secondary functionality components are not limited to the features described above, as the above features are merely listed for demonstration purposes, but rather the secondary functionality components may encompass variations thereof or any other suitable functionality feature that can enhance the performance of the retrofit insulation.

After the fabrication is complete, in the installation stage 150, the fabricated insulation may be installed on the façade. Because the above-referenced documentation, design, and fabrication stages are highly customized, the time and labor associated with on-site installation may be significantly reduced. No materials need to be cut on-site, no details need to be decided on-site, and waste and clean up tasks are largely reduced. Various fastening techniques can be used, including mechanical fasteners and adhesives. Notably, newer cladding systems can be designed such that existing cladding does not have to be removed, thus reducing on-site labor. Also, during the design phase, certain aspects of the design may be modified in order to optimize the installation process. For example, panel sizes can be optimized to reduce the need for scaffolding.

After installation, the retrofitted insulation may need to be maintained on occasion. The ability to fabricate tailored façades solutions allows more optimal detailing that can minimize maintenance. Further, the thermal performance of such customized cladding may be much improved, as insulation panels will fit the building more precisely. In situations where façade elements become damaged or where future building alterations are needed, existing CAD models can be used as a basis for creating reproductions. This can eliminate the documentation phase and facilitate future design efforts.

Figure 8:
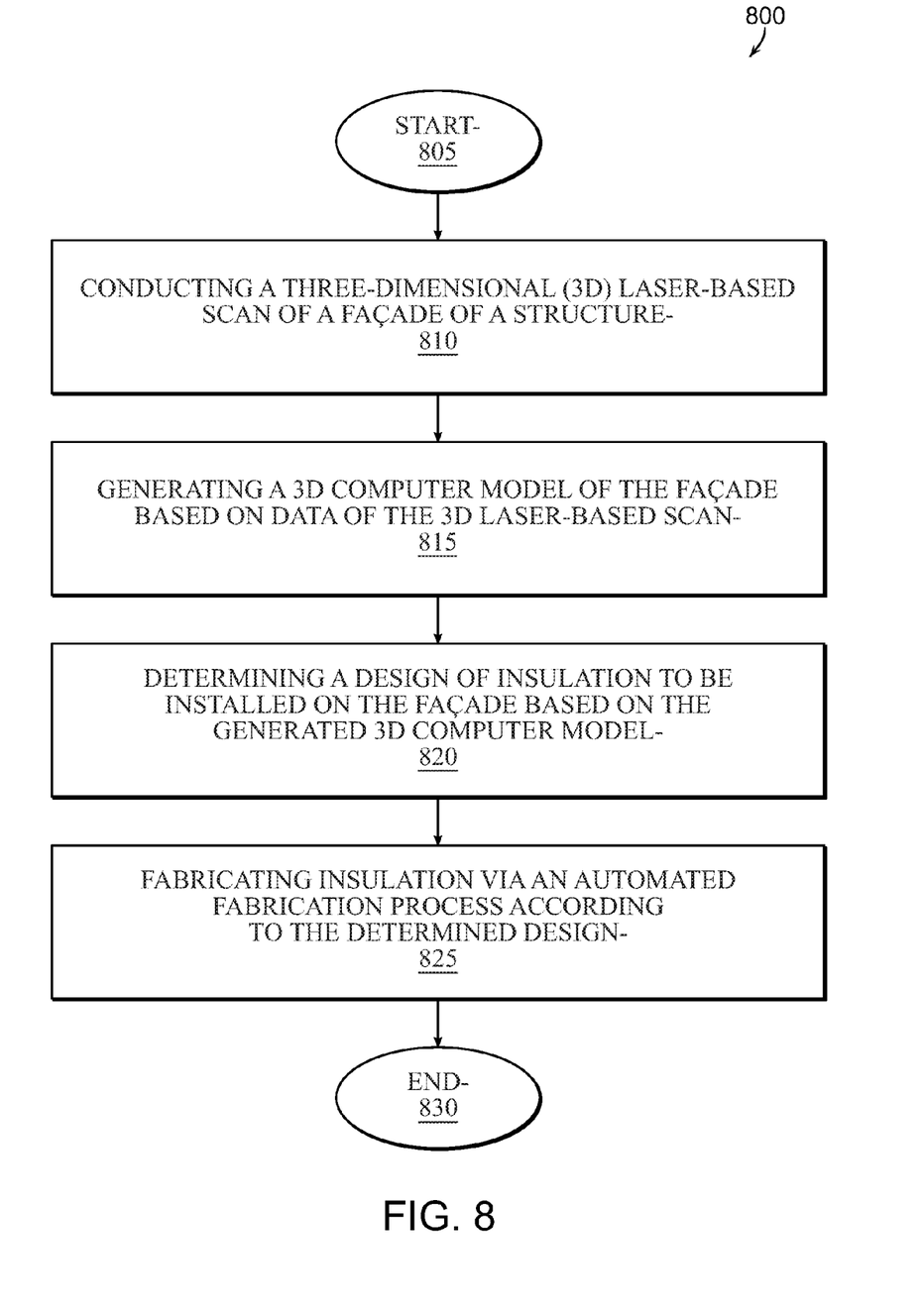
FIG. 8 illustrates an example flow chart for a method for fabricating insulated cladding systems for retrofit applications according to an embodiment of the present invention.

FIG. 8 illustrates an example flow chart for a method for fabricating insulated cladding systems for retrofit applications according to an embodiment of the present invention. As shown in FIG. 8, the procedure 800 may start at step 805, continue to step 810, and so forth. Although FIG. 8 depicts steps in a particular order, it should be understood that the depicted embodiment is not limiting, and the particular order is depicted merely for illustration purposes.

At step 810, a 3D laser-based scan of a façade of a structure is conducted (e.g., the documentation stage 110). Then, at step 815, a 3D computer model of the façade is generated based on data of the 3D laser-based scan (e.g., the 3D model generation stage 120). At step 820, a design of insulation to be installed on the façade is determined based on the generated 3D computer model (e.g., the insulation design stage 130). Finally, at step 825, according to the determined design, insulation is fabricated via an automated fabrication process (e.g., the automated fabrication stage 140). The procedure 800 illustratively ends at step 830. The techniques by which the steps of procedure 800 may be performed, as well as ancillary procedures and parameters, are described in detail above.

It should be understood that one or more of the above steps may be performed by a controller, as defined above. It should also be understood that the steps shown in FIG. 8 are merely examples for illustration, and certain steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a façade retrofit system that offers an improved technical design that results in more robust buildings, greater variety in cladding options and potential for better aesthetics, less maintenance, increased long-term property value, less energy consumption resulting in more energy independence, and less waste.

While there have been shown and described illustrative embodiments that provide for fabrication techniques in insulated cladding systems for retrofit applications, it is to be understood that various other adaptations and modifications may be made within the spirit and scope of the embodiments herein, with the attainment of some or all of their advantages. For instance, it is expressly contemplated that the components and/or elements described herein can be implemented as a system comprising a 3D laser-based scanning device, a model generating controller, a design controller, and an automated fabrication tool, as described above. Moreover, it is expressly contemplated that the components and/or elements described herein can be implemented as software being stored on a tangible, non-transitory computer-readable medium (e.g., disks/CDs/RAM/EEPROM/etc.) having program instructions executable by a controller, as described above, which may constitute hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    conducting a three-dimensional (3D) laser-based scan of a façade of a structure;
    generating a 3D computer model of the façade based on data of the 3D laser-based scan;
    generating a plurality of insulation design alternatives based on the generated 3D computer model;
    determining one design of the plurality of insulation design alternatives to be installed on the façade based on one or more criteria selected from a group consisting of: energy efficiency, appearance, and a machinery limitation; and fabricating insulation via an automated fabrication process according to the determined design, wherein the automated fabrication process comprises:

forming casting cavities in a substrate, creating casting barriers in the substrate operable to contain a first resin-based substance having a first viscosity, casting the first resin-based substance in the formed casting cavities, processing the casted first resin-based substance to form an insulation panel, and depositing a second resin-based substance having a second viscosity higher than the first viscosity on the processed and casted first resin-based substance so as to create an additional feature on the insulation panel in accordance with the determined design.

2. The method according to claim 1, further comprising: installing the fabricated insulation on the façade.

3. The method according to claim 1, further comprising: programming a computer numerical control (CNC) manufacturing tool according to the determined design; and fabricating the insulation using the CNC manufacturing tool.

4. The method according to claim 3, further comprising: translating the determined design into a format suitable for the programming of the CNC manufacturing tool.

5. The method according to claim 1, further comprising: programming a computer aided design (CAD) tool according to the data of the 3D laser-based scan; and generating the 3D computer model using the CAD tool.

6. The method according to claim 1, wherein the generated 3D computer model is a Building Information Model (BIM).

7. The method according to claim 1, further comprising: modifying an aspect of the generated 3D computer model to affect a performance of the insulation.

8. The method according to claim 1, further comprising: estimating a cost of the determined design; and modifying the determined design based on the estimated cost.

9. The method according to claim 1, further comprising: accessing a database of stored insulation design data; and determining the design further based on the stored insulation design data.

10. The method according to claim 1, wherein the automated fabrication process further comprises:

depositing a finishing coat on a surface of the insulation panel, and forming a foam gasket in the insulation panel to seal an edge of the insulation panel.

11. The method according to claim 1, wherein the fabricating of the insulation comprises:

adding a secondary functionality component to the insulation.

12. A system, comprising:

a 3D laser-based scanning device that conducts a 3D laser-based scan of a façade of a structure;

a model generating controller that generates a 3D computer model of the façade based on data of the 3D laser-based scan;

a design controller that generates a plurality of insulation design alternatives based on the generated 3D computer model, and determines one design of the plurality of insulation design alternatives to be installed on the façade based on one or more criteria selected from a group consisting of: energy efficiency, appearance, and a machinery limitation; and an automated fabrication tool that fabricates insulation via an automated fabrication process according to the determined design, wherein the automated fabrication process comprises:

forming casting cavities in a substrate, creating casting barriers in the substrate operable to contain a first resin-based substance having a first viscosity, casting the first resin-based substance in the formed casting cavities, processing the casted first resin-based substance to form an insulation panel, and depositing a second resin-based substance having a second viscosity higher than the first viscosity on the processed and casted first resin-based substance so as to create an additional feature on the insulation panel in accordance with the determined design.

13. The system according to claim 12, wherein the automated fabrication tool is a computer numerical control (CNC) manufacturing tool that is programmed according to the determined design.

14. The system according to claim 13, wherein the determined design is translated into a format suitable for the CNC manufacturing tool to be programmed.

15. The system according to claim 12, wherein the model generating controller is a component of a computer aided design (CAD) tool that is programmed according to the data of the 3D laser-based scan.

16. The system according to claim 12, wherein the generated 3D computer model is a Building Information Model (BIM).

* * * * *